US012627044B2

(12) United States Patent
Zhu et al.

(10) Patent No.: US 12,627,044 B2
(45) Date of Patent: May 12, 2026

(54) ANTENNA DEVICE WITH ANTENNA UNITS WITH PHASE SHIFT UNITS

(71) Applicant: Shanghai Tianma Microelectronics Co., Ltd., Shanghai (CN)

(72) Inventors: Qingsan Zhu, Shanghai (CN); Feng Qin, Shanghai (CN); Kerui Xi, Shanghai (CN); Zhenyu Jia, Shanghai (CN); Dengming Lei, Shanghai (CN); Yunfei Bai, Shanghai (CN); Yi Wang, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 319 days.

(21) Appl. No.: 17/712,258

(22) Filed: Apr. 4, 2022

(65) Prior Publication Data

US 2022/0224006 A1 Jul. 14, 2022

(30) Foreign Application Priority Data

Dec. 31, 2021 (CN) ......................... 202111673932.9

(51) Int. Cl.
*H01Q 3/30* (2006.01)
*H01Q 3/44* (2006.01)

(52) U.S. Cl.
CPC ................. *H01Q 3/30* (2013.01); *H01Q 3/44* (2013.01)

(58) Field of Classification Search
CPC ........... H01Q 3/30; H01Q 21/065; H01Q 3/44
See application file for complete search history.

(56) References Cited

U.S. PATENT DOCUMENTS

| | | | | |
|---|---|---|---|---|
| 2014/0266897 | A1* | 9/2014 | Jakoby | H01Q 3/44 29/601 |
| 2020/0227835 | A1* | 7/2020 | Kim | H01Q 21/065 |
| 2021/0399436 | A1* | 12/2021 | Kang | H01Q 21/0087 |
| 2022/0013902 | A1* | 1/2022 | Bueno-Baques | H01Q 3/22 |
| 2022/0077596 | A1* | 3/2022 | Xi | H01Q 21/0075 |
| 2022/0115780 | A1* | 4/2022 | Wang | H01Q 9/0414 |

(Continued)

FOREIGN PATENT DOCUMENTS

| | | |
|---|---|---|
| CN | 107706502 A | 2/2018 |
| CN | 108538823 A | 9/2018 |
| CN | 109765734 A | 5/2019 |

(Continued)

*Primary Examiner* — Dameon E Levi
*Assistant Examiner* — Yonchan J Kim
(74) *Attorney, Agent, or Firm* — KDW FIRM PLLC

(57) ABSTRACT

Provided is an antenna device. The antenna device includes at least one antenna unit and first connection lines, where each antenna unit includes a first substrate and a second substrate, a region where the first substrate and the second substrate overlap forms a phase shift region in a thickness direction of the first substrate; the second substrate includes a first step protruding from the phase shift region in a first direction, a side of the first step close to the first substrate is provided with multiple first pads arranged in a second direction, the first pads are disposed on a side of the second substrate close to the first substrate, and the first direction intersects the second direction; and the first pads are connected to the first connection lines, and the first pads receive a drive signal output by an external driver circuit through the first connection lines.

14 Claims, 13 Drawing Sheets

(56) References Cited

U.S. PATENT DOCUMENTS

2023/0098813 A1* 3/2023 Fang ........................ G02F 1/13
342/372

FOREIGN PATENT DOCUMENTS

| | | | |
|---|---|---|---|
| CN | 112425001 | A | 2/2021 |
| CN | 113075808 | A | 7/2021 |
| CN | 113571909 | A | 10/2021 |

* cited by examiner

ANTENNA DEVICE WITH ANTENNA UNITS WITH PHASE SHIFT UNITS

CROSS-REFERENCE TO RELATED APPLICATION(S)

This application claims priority to Chinese Patent Application No. 202111673932.9 filed with the China National Intellectual Property Administration (CNIPA) on Dec. 31, 2021, the disclosure of which is incorporated herein by reference in its entirety.

TECHNICAL FIELD

Embodiments of the present disclosure relate to the technical field of communications, and in particular to an antenna device.

BACKGROUND

A phased array antenna is an important radio device for transmitting and receiving electromagnetic waves, and the phased array antenna controls phases of radio frequency signals of antenna units in an array antenna through a phase shifter to change a radiation direction of the antenna to achieve the purpose of beam scanning.

An existing phased array antenna has the problem of large size and is not beneficial to the miniaturization application of the phased array antenna.

SUMMARY

The present disclosure provides an antenna device, reducing the size of the whole antenna device and achieving the miniaturization application of the antenna device.

An embodiment of the present disclosure provides an antenna device. The antenna device includes an antenna unit and first connection lines, the antenna unit includes a first substrate and a second substrate disposed opposite to each other; a region where the first substrate and the second substrate overlap forms a phase shift region in a thickness direction of the first substrate; the second substrate includes a first step protruding from the phase shift region in a first direction, a side of the first step close to the first substrate is provided with multiple first pads arranged in a second direction, and the multiple first pads are disposed on a side of the second substrate close to the first substrate, and the first direction intersects the second direction; and each of the multiple first pads is connected to a respective one of the first connection lines, and the multiple first pads are configured to receive a drive signal output by an external driver circuit through the first connection lines.

DETAILED DESCRIPTION

Figure 1:
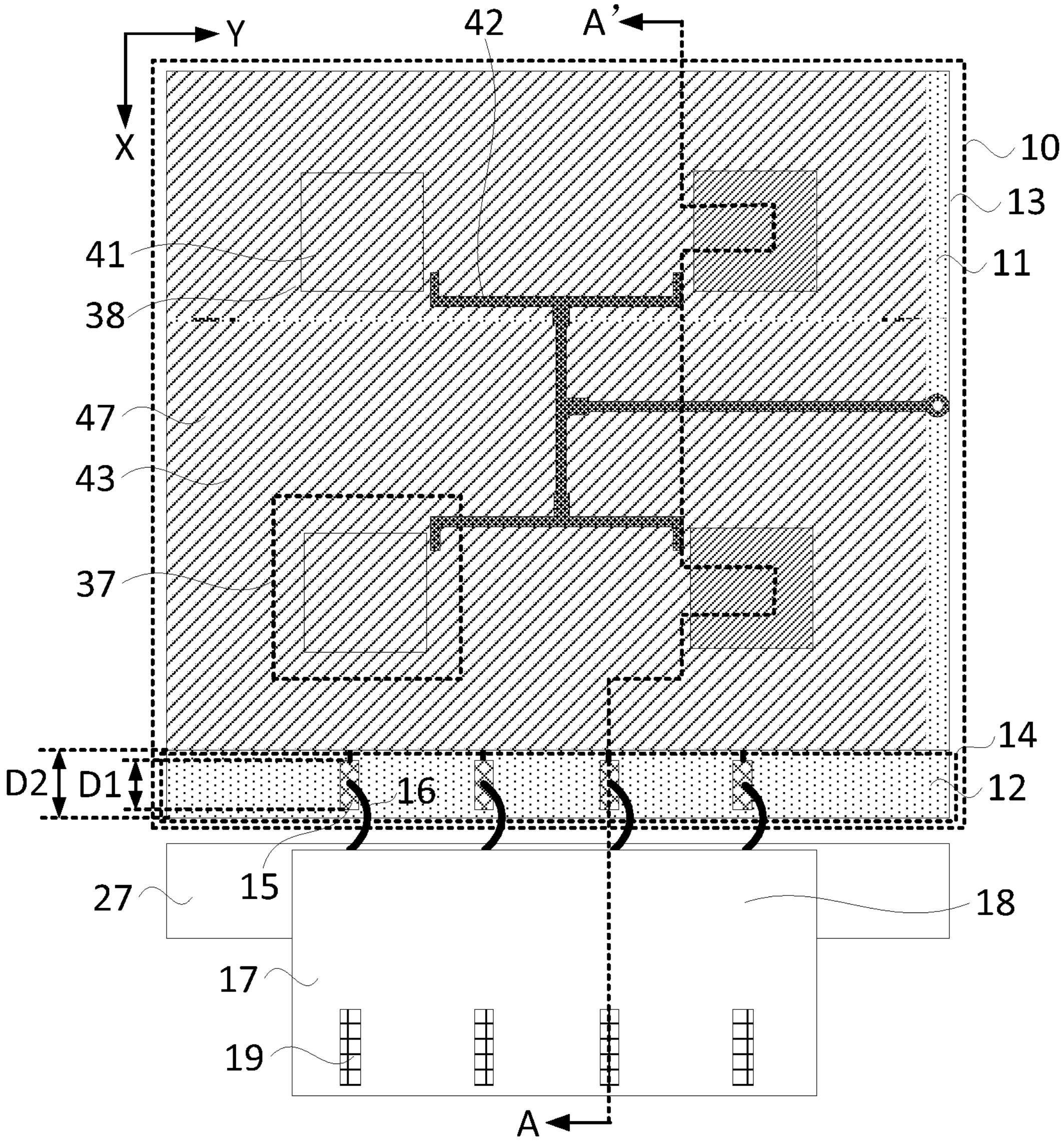
FIG. 1 is a structural diagram of an antenna device according to an embodiment of the present disclosure.

The present disclosure will be further described in detail in conjunction with the drawings and embodiments below. It should be understood that the specific embodiments described herein are merely used for explaining the present disclosure and are not intended to limit the present disclosure. It should also be noted that, for ease of description, only part, but not all, of the structures related to the present disclosure are shown in the drawings.

Figure 2:
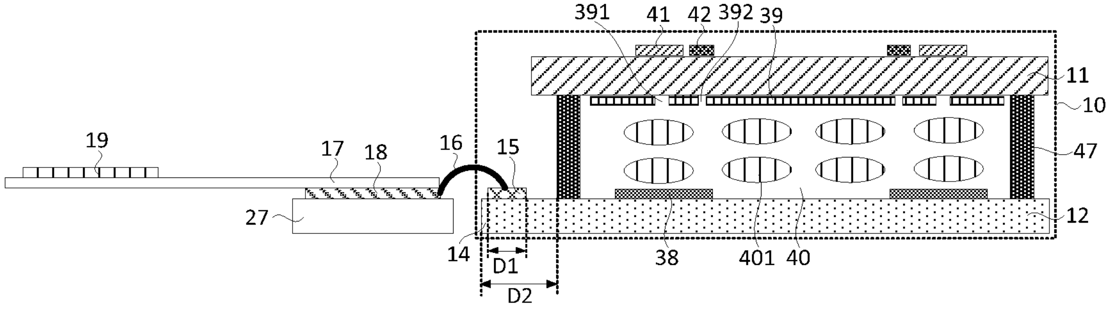
FIG. 2 is a cross sectional view taken along an A-A' direction of FIG. 1.

FIG. 1 is a structural diagram of an antenna device according to an embodiment of the present disclosure, and FIG. 2 is a cross sectional view taken along an A-A' direction of FIG. 1. As shown in FIG. 1 and FIG. 2, the antenna device provided in the embodiment of the present disclosure includes an antenna unit 10, the antenna unit 10 includes a first substrate 11 and a second substrate 12 disposed opposite to each other, a region where the first substrate 11 and the second substrate 12 overlap forms a phase shift region 13 in a thickness direction of the first substrate 11, the second substrate 12 includes a first step 14 protruding from the phase shift region 13 in a first direction X, a side of the first step 14 close to the first substrate 11 is provided with multiple first pads 15 arranged in a second direction Y, the first pads 15 are disposed on a side of the second substrate 12 close to the first substrate 11, and the first direction X intersects the second direction Y. The antenna device further includes first connection lines 16, the first pads 15 are connected to the first connection lines 16, and the first pads 15 receive a drive signal output by an external driver circuit through the first connection lines 16.

The antenna device may include one antenna unit 10 or may include multiple antenna units 10, and FIG. 1 is only an example of the antenna device including one antenna unit 10, which may be set by those skilled in the art according to actual requirements.

With continued reference to FIGS. 1 and 2, the antenna unit 10 includes the first substrate 11 and the second substrate 12 disposed opposite to each other, the region where the first substrate 11 and the second substrate 12 overlap forms the phase shift region 13, and the phase shift region 13 may adjust a phase of a radio frequency signal. Specifically, a drive signal is accessed to the phase shift region 13 to adjust the phase of the radio frequency signal according to the drive signal, a phase adjusted in a phase shift process of the radio frequency signal may be controlled by controlling the drive signal, and finally, it is achieved that the beam direction of the radio frequency signal transmitted by the antenna unit 10 is controlled, and the beam scanning is achieved.

With continued reference to FIGS. 1 and 2, the second substrate 12 includes the first step 14 protruding from the phase shift region 13 in the first direction X, the first step 14 is configured to dispose the first pads 15, the first pad 15 is connected to the first connection line 16, to receive a drive signal output by the external driver circuit through the first connection line 16. The first pads are disposed on the first step 14 protruding from the phase shift region 13, so that when the first pads 15 are connected to the first connection lines 16, it will not be limited by the space of the first substrate 11, which facilitates the connection between the first pad 15 and the first connection line 16. Meanwhile, the first pads 15 are arranged in the second direction Y intersecting the first direction X, which is conducive to reducing the width of the first step 14.

It should be noted that an included angle between the first direction X and the second direction Y may be set according to actual requirements, for example, the first direction X may be disposed to be perpendicular to the second direction Y as shown in FIG. 1, but which is not limited thereto.

Furthermore, the first pads 15 receive the drive signal output by the external driver circuit through the first connection lines 16, to connect the drive signal to the first step 14 of the second substrate 12, and the drive signal may be connected to the phase shift region 13 from the first step 14 through manners such as wiring or disposing a conductive structure on the second substrate 12, thereby achieving the adjustment of the phase of the radio frequency signal.

Figure 3:
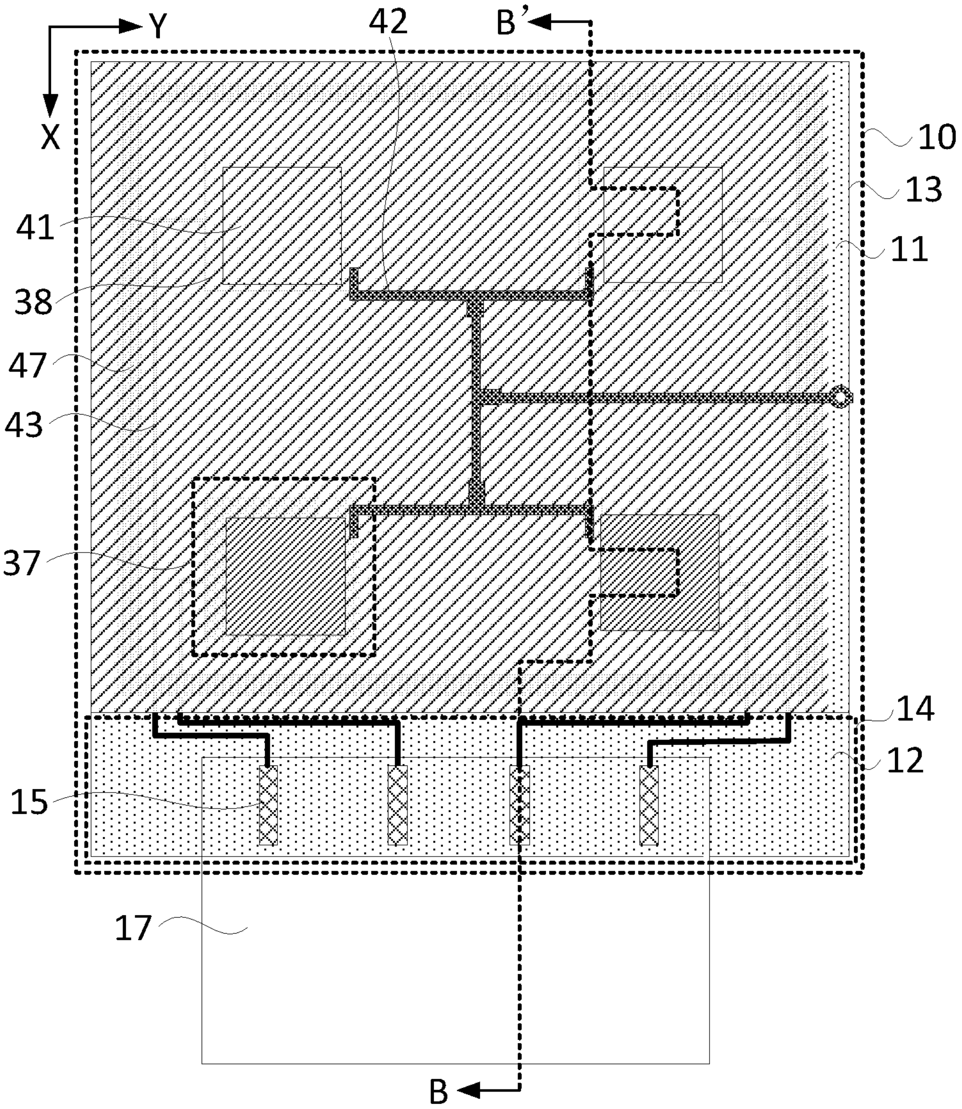
FIG. 3 is a structural diagram of an antenna device in the related art.
Figure 4:
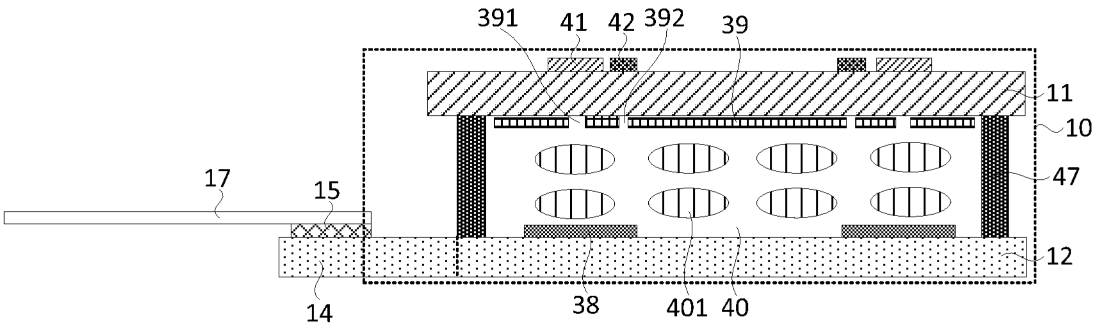
FIG. 4 is a cross sectional view taken along a B-B' direction of FIG. 3.

FIG. 3 is a structural diagram of an antenna device in the related art, and FIG. 4 is a cross sectional view taken along a B-B' direction of FIG. 3. As shown in FIG. 3 and FIG. 4, if the first pads 15 are directly bound to a flexible printed circuit (FPC) 17 to receive a drive signal output by an external driver circuit through the flexible printed circuit 17, then the first pad 15 is required to have larger size to ensure the firmness of binding between the first pad 15 and the flexible printed circuit 17, thereby achieving the reliable transmission of the drive signal. At this point, the first step 14 needs to be set wider to provide setting space for the first pads 15. The inventor finds that if the first pads 15 are directly bound to the flexible printed circuit 17, then the width of the first step 14 needs to be set to 1.4 mm or above, so that the requirements for binding and supporting the flexible printed circuit 17 may be satisfied.

In this embodiment, with continued reference to FIGS. 1 and 2, the first pad 15 receives the drive signal output by the external driver circuit through the first connection line 16 instead of being directly bound to the flexible printed circuit 17, so that the size of the first pad 15 can be reduced while the connection firmness and the transmission reliability of the drive signal are ensured, and the width of the first step 14 can be reduced, which is conducive to reducing the size of the whole antenna device and achieving the miniaturization application of the antenna device.

In conclusion, according to the antenna device provided in the embodiment of the present disclosure, the first step 14 protruding from the phase shift region 13 is disposed on the second substrate 12, and the first pads 15 are disposed on the first step 14, which is conducive to receiving a drive signal required for performing a phase shift on a radio frequency signal. Meanwhile, the first pads 15 are connected to the first connection lines 16 to receive the drive signal output by the external driver circuit through the first connection lines 16, so that the size of the first pad 15 can be reduced while the connection firmness and the transmission reliability of the drive signal are ensured, and the width of the first step 14 can be reduced, which is conducive to reducing the size of the whole antenna device and achieving the miniaturization application of the antenna device.

With continued reference to FIGS. 1 and 2, optionally, the length of the first pad 15 in the first direction X is D1, and D1≤100 μm.

As shown in FIGS. 1 and 2, the first pads 15 are connected to the first connection lines 16 to receive the drive signal output by the external driver circuit through the first connection lines 16, so that the length D1 of the first pad 15 in the first direction X can be reduced to 100 μm while the transmission reliability of the drive signal is ensured, and the width of the first step 14 can be reduced, which is conducive to reducing the size of the whole antenna device and achieving the miniaturization application of the antenna device.

It should be noted that a value of the length D1 of the first pad 15 in the first direction X may be set according to actual requirements, for example, D1=40 μm, but which is not limited thereto. The value of the length D1 of the first pad 15 in the first direction X is not limited in the embodiments of the present disclosure.

Further, the first pad 15 receives the drive signal output by the external driver circuit through the first connection line 16 instead of being directly bound to the flexible printed circuit 17, so that the size of the first pad 15 can be reduced and there is no need to provide a wider first step 14 to support the flexible printed circuit 17, which is conducive to reducing the size of the whole antenna device and achieving the miniaturized application of the antenna device.

Optionally, the length of the first step 14 in the first direction X is D2, and D2≤0.2 mm.

As shown in FIGS. 1 and 2, the length D2 of the first step 14 in the first direction X may be reduced to within 0.2 mm due to the reduction in the size of the first pad 15, which contributes to a reduction in the size of the whole antenna device while providing sufficient setting space for the first pads 15, and thus the miniaturization application of the antenna device is achieved.

It should be noted that a value of the length D1 of the first pad 15 in the first direction X may be set according to actual requirements, which is not limited in the embodiments of the present disclosure.

With continued reference to FIGS. 1 and 2, optionally, the antenna device provided in the embodiment of the present disclosure further includes multiple binding terminals 18, each of the multiple binding terminals 18 is connected to a respective one of the first connection lines 16, and the binding terminals 18 are configured to be connected to the external driver circuit.

Exemplarily, as shown in FIGS. 1 and 2, the binding terminals 18 are configured to be connected to the external driver circuit to receive the drive signal provided by the external driver circuit.

Exemplarily, as shown in FIGS. 1 and 2, the external driver circuit may be disposed on other main boards, the binding terminals 18 may be in binding connection with the flexible printed circuit 17, the flexible printed circuit 17 is further provided with connection binding terminals 19, and the connection binding terminals 19 are electrically connected to binding connection points between the flexible printed circuit 17 and the binding terminals 18. The connection binding terminals 19 are configured to be in binding connection with the external driver circuit, thereby achieving an electrical connection between the external driver circuit and the binding terminals 18.

In another embodiment, the external circuit may be directly disposed on the flexible printed circuit 17, and the binding terminals 18 are in binding connection with the flexible printed circuit 17, so that the binding terminals 18 receive the drive signal provided by the external circuit through the flexible printed circuit 17.

In another embodiment, the binding terminals 18 may also be directly connected to the external circuit to receive a drive voltage signal provided by the external circuit, which is not limited in the embodiments of the present disclosure.

Further, as shown in FIGS. 1 and 2, each of the first pads 15 is correspondingly connected to a respective one of the binding terminals 18 through a respective one of the first connection lines 16, thereby achieving that the first pads 15 receive the drive signal output by the external driver circuit.

It should be noted that when the antenna device is used, the flexible printed circuit 17 may be bent to a side of the second substrate 12 away from the first substrate 11, so that the influence of the flexible printed circuit 17 on the width of a frame of the antenna device can be avoided on the basis of narrowing the first step 14, which is conducive to reducing the size of the whole antenna device and achieving the miniaturization application of the antenna device.

Figure 5:
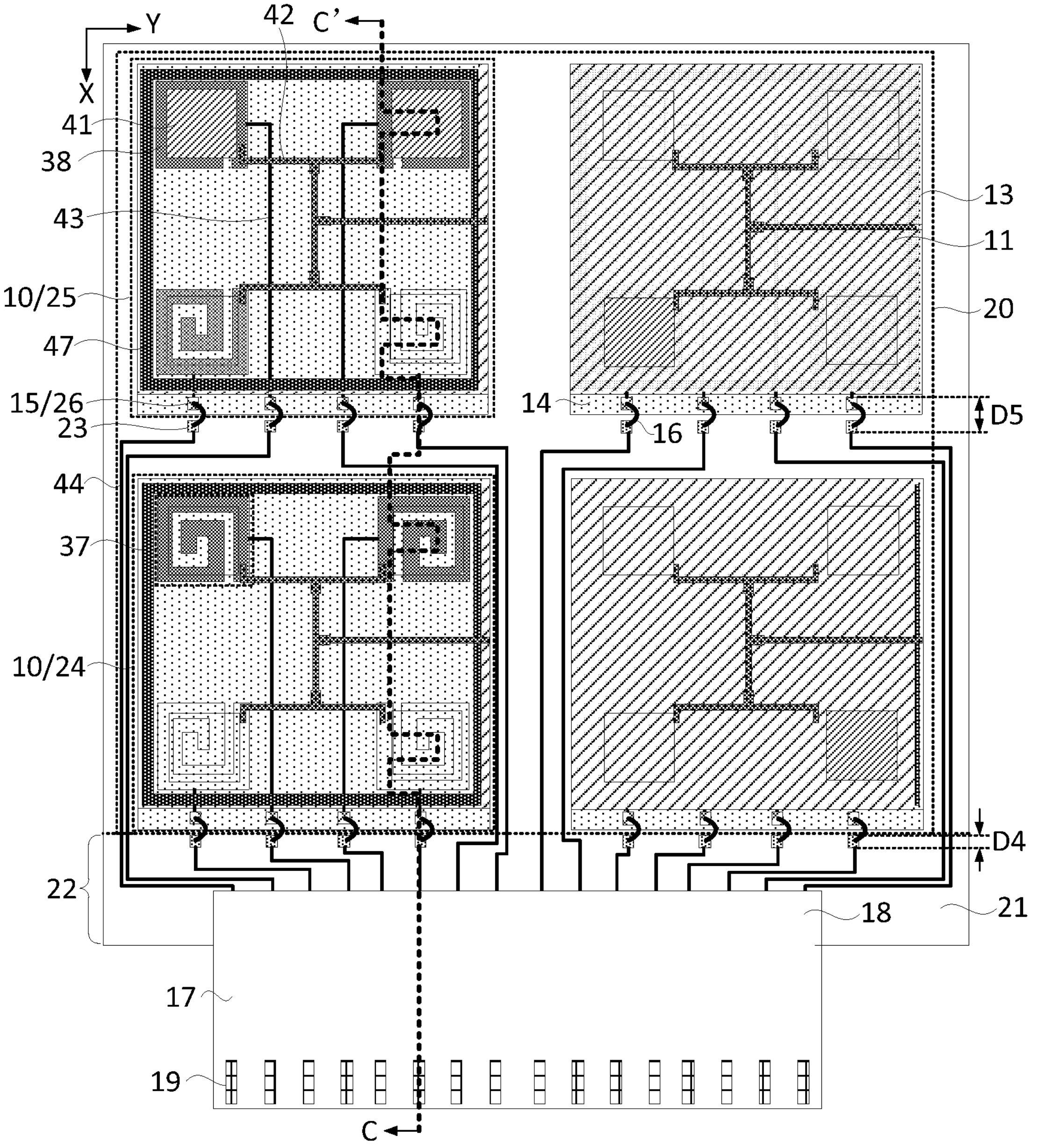
FIG. 5 is a structural diagram of another antenna device according to an embodiment of the present disclosure.
Figure 6:
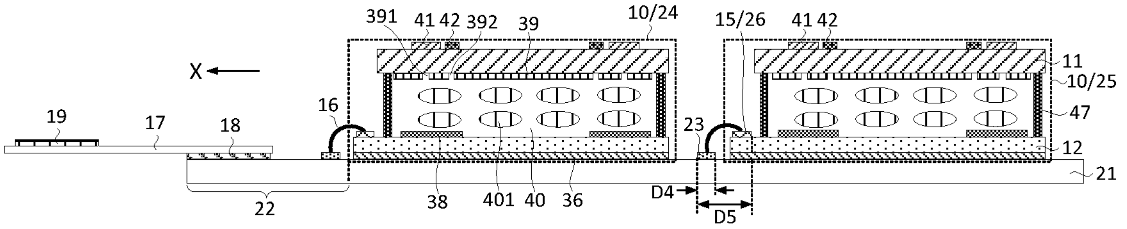
FIG. 6 is a cross sectional view taken along a C-C' direction of FIG. 5.

FIG. 5 is a structural diagram of another antenna device according to an embodiment of the present disclosure, and FIG. 6 is a cross sectional view taken along a C-C' direction of FIG. 5. As shown in FIG. 5 and FIG. 6, optionally, the antenna device provided in the embodiment of the present disclosure includes multiple antenna units 10 arranged in an array to form an antenna unit array 20.

Exemplarily, as shown in FIG. 5 and FIG. 6, the antenna device provided in the embodiment of the present disclosure includes multiple antenna units 10, and the multiple antenna units 10 are mutually spliced to form the antenna unit array 20, so that the antenna device is not limited by wiring and yield, and the transceiving efficiency and gain of the antenna can be improved, thereby satisfying the requirement of high gain of the antenna device.

The number of antenna units 10 may be set according to actual requirements, for example, as shown in FIG. 5, it may be set that the antenna device includes four antenna units 10.

Figure 7:
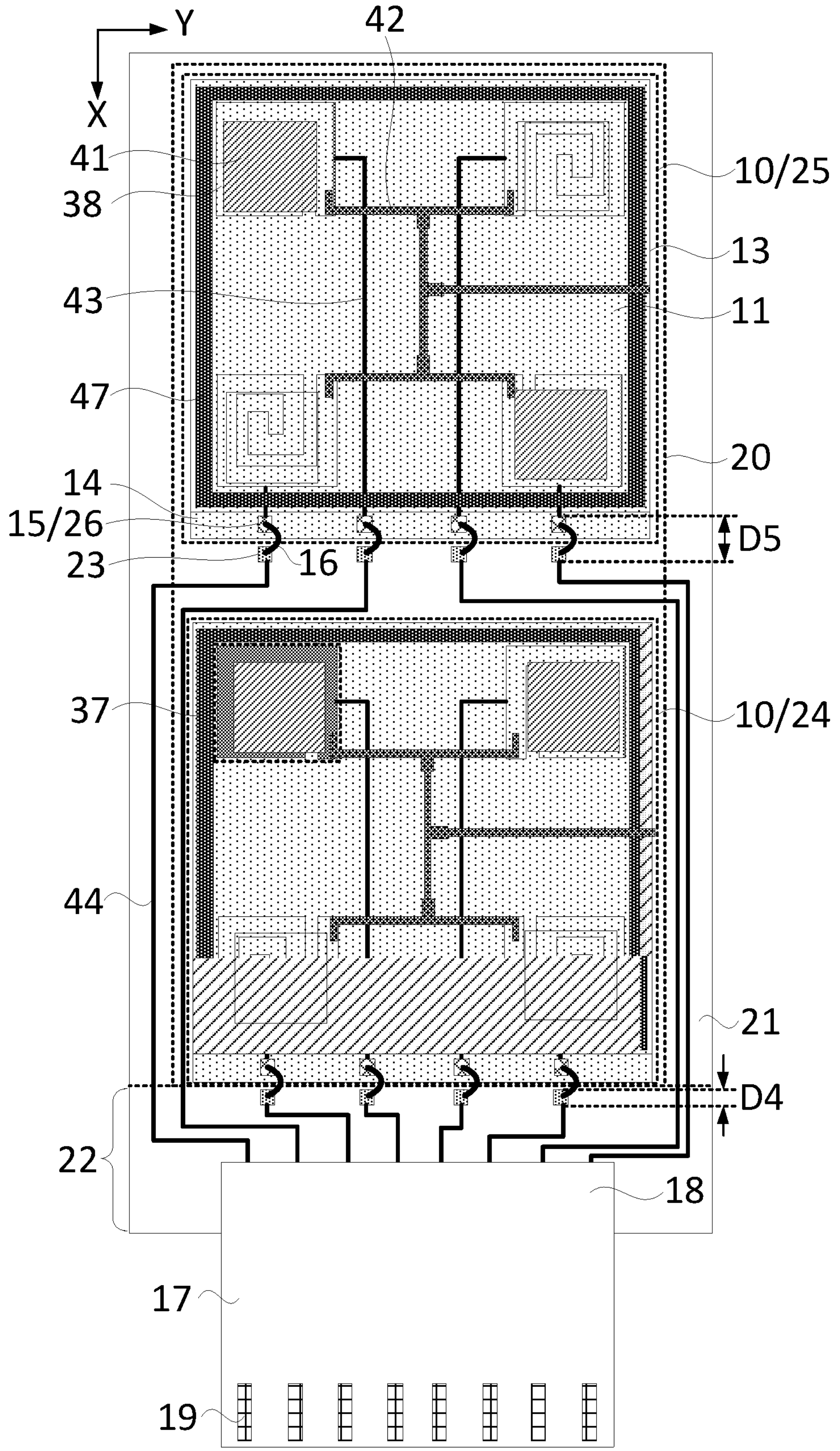
FIG. 7 is a structural diagram of another antenna device according to an embodiment of the present disclosure.

FIG. 7 is a structural diagram of another antenna device according to an embodiment of the present disclosure. As shown in FIG. 7, the antenna device may include only two antenna units 10, and in other embodiments, the antenna device may include more antenna units 10, which are not limited in the embodiments of the present disclosure.

With continued reference to FIGS. 5 to 7, optionally, the antenna device provided in the embodiments of the present disclosure further includes a support substrate 21, and the antenna units 10 are arranged on a side of the support substrate 21.

Exemplarily, as shown in FIGS. 5 to 7, the support substrate 21 is disposed to support and fix the antenna units 10, thereby ensuring the reliability of the antenna unit array 20.

With continued reference to FIGS. 5 to 7, optionally, the support substrate 21 includes a second step 22, the second step 22 is located outside a coverage region of a vertical projection of the antenna unit array 20 on a plane where the support substrate 21 is located, and the second step 22 is located at an edge of the antenna device, the multiple binding terminals 18 are disposed on the second step 22, and the multiple binding terminals 18 and the antenna unit array 20 are disposed on a same side of the support substrate 21.

Exemplarily, as shown in FIGS. 5 to 7, the second step 22 protruding from the antenna unit array 20 is disposed on the support substrate 21 in a direction parallel to a plane where the first substrate 11 is located, and the second step 22 is located at the edge of the antenna device, so that the binding terminals 18 are disposed on the second step 22, the binding terminals 18 are configured to be in binding connection with the flexible printed circuit 17, and the flexible printed circuit 17 is connected to the external driver circuit. Therefore, the access of the drive signal is achieved. The second step 22 protruding from the antenna unit array 20 is disposed on the edge of the antenna device, and the binding terminals 18 are disposed on the second step 22, so that when the binding terminals 18 are bound to the flexible printed circuit 17, it will not be limited by the space of the antenna unit array 20, and the binding between the binding terminals 18 and the flexible printed circuit 17 is facilitated.

With continued reference to FIGS. 5 to 7, optionally, the antenna device provided in the embodiments of the present disclosure further includes multiple second pads 23, the second pads 23 are disposed on the support substrate 21, the second pads 23 and the antenna unit array 20 are disposed on a same side of the support substrate 21, each of the second pads 23 is connected to a respective one of the first pads 15 through a respective one of the first connection lines 16, and each of the binding terminals 18 is connected to a respective one of the second pads 23.

As shown in FIGS. 5 to 7, the binding terminals 18 are disposed on the support substrate 21 and the second step 22 where the binding terminals 18 are located is located at the edge of the antenna device; on one hand, the binding terminals 18 and the first pads 15 are not disposed on a same substrate; and on the other hand, a distance between the binding terminals 18 and part of the first pads 15 is relatively long, so that it is difficult to directly connect the binding terminals 18 and the first pads 15.

In this embodiment, the second pads 23 are disposed on the support substrate 21, each of the binding terminals 18 is connected to a respective one of the second pads 23, and each of the second pads 23 is connected to a respective one of the first pads 15 through a respective one of the first connection lines 16, so that the second pads 23 play a role in transferring the drive signal, to introduce the drive signal to the first pads 15 on the second substrate 12 from the binding terminals 18 on the support substrate 21. Therefore, the difficulty of the connection between the binding terminals 18 and the first pads 15 is reduced and the connection is easy to be implemented.

With continued reference to FIGS. 5 to 7, optionally, the second pads 23 may be connected to the binding terminals 18 through first signal transmission lines 44 disposed on the support substrate 21, but which is not limited thereto.

With continued reference to FIGS. 5 to 7, optionally, the multiple antenna units 10 include a first antenna unit 24 and a second antenna unit 25 disposed adjacent to each other, and in the first direction X, the first antenna unit 24 is disposed on a side of the first step 14 of the second antenna unit 25 away from the phase shift region 13 of the second antenna unit 25; the first pad 15 disposed on the first step 14 of the second antenna unit 25 is a first connection pad 26, and the second pad 23 correspondingly connected to the first connection pad 26 is disposed on a side of the first antenna unit 24 close to the second antenna unit 25.

As shown in FIGS. 5 to 7, since the first pads 15 receive the drive signal output by the external driver circuit through the first connection lines 16 instead of being directly bound to the flexible printed circuit 17, so that the size of the first pad 15 can be reduced, and thus the width of the first step 14 can be reduced. At this point, without the limitation of the flexible printed circuit 17, the splicing may be performed on a side of the first step 14 of the antenna unit 10, that is, the periphery of the antenna unit 10 and other antenna units 10 may be spliced, so that the splicing flexibility of the antenna units 10 is improved, which is conducive to achieving the antenna unit array 20 with large size.

Further, as shown in FIGS. 5 to 7, in this embodiment, the first connection pads 26 are disposed between the first antenna unit 24 and the second antenna unit 25 disposed adjacent to each other, so that the distance between the first connection pad 26 and the second pad 23 correspondingly connected to the first connection pad 26 is reduced, and thus the difficulty of connecting the first connection pad 26 and the second pad 23 through the first connection line 16 is reduced.

With continued reference to FIGS. 1 and 2, optionally, the antenna device provided in the embodiment of the present disclosure further includes a binding substrate 27, and the binding terminals 18 are disposed on the binding substrate 27.

Exemplarily, as shown in FIGS. 1 and 2, the binding substrate 27 is provided, and the binding substrate 27 is configured to dispose the binding terminals 18, to provide support for the binding terminals 18 while facilitating binding of the binding terminals 18 to the flexible printed circuit 17.

Further, when the antenna device is manufactured, the binding substrate 27 may be bent to a side of the second substrate 12 away from the first substrate 11, so that the influence of the binding substrate 27 on the width of the frame of the antenna device can be avoided.

Figure 8:
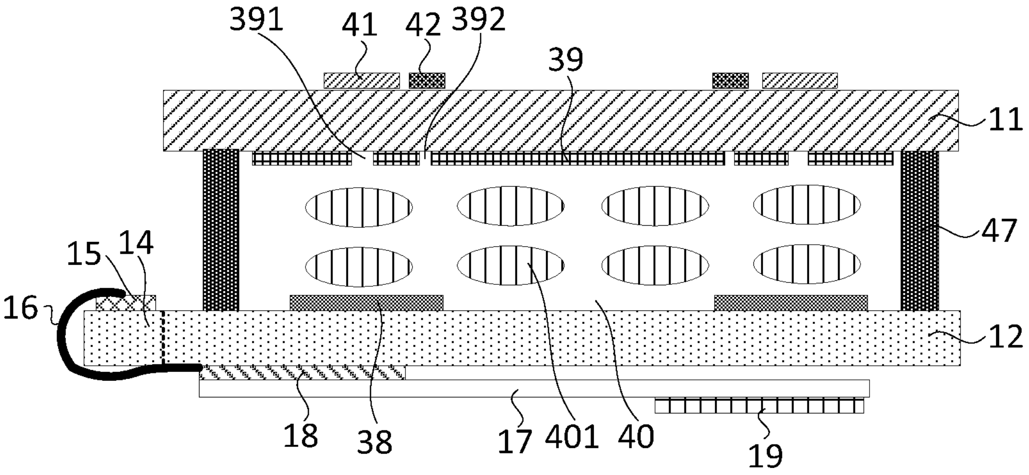
FIG. 8 is a structural diagram of another antenna device according to an embodiment of the present disclosure.

FIG. 8 is a structural diagram of another antenna device according to an embodiment of the present disclosure. As shown in FIG. 8, optionally, the binding terminals 18 are disposed on a side of the second substrate 12 away from the first substrate 11.

Exemplarily, as shown in FIG. 8, the binding terminals 18 may also be disposed directly on the side of the second substrate 12 away from the first substrate 11, so that the influence of the flexible printed circuit 17 on the width of the frame of the antenna device can be avoided.

It should be noted that the setting positions of the binding terminals 18 are not limited to the above-described embodiments, and the positions of the binding terminals 18 may be set according to actual requirements in practical applications, which is not limited in the embodiments of the present disclosure.

Figure 9:
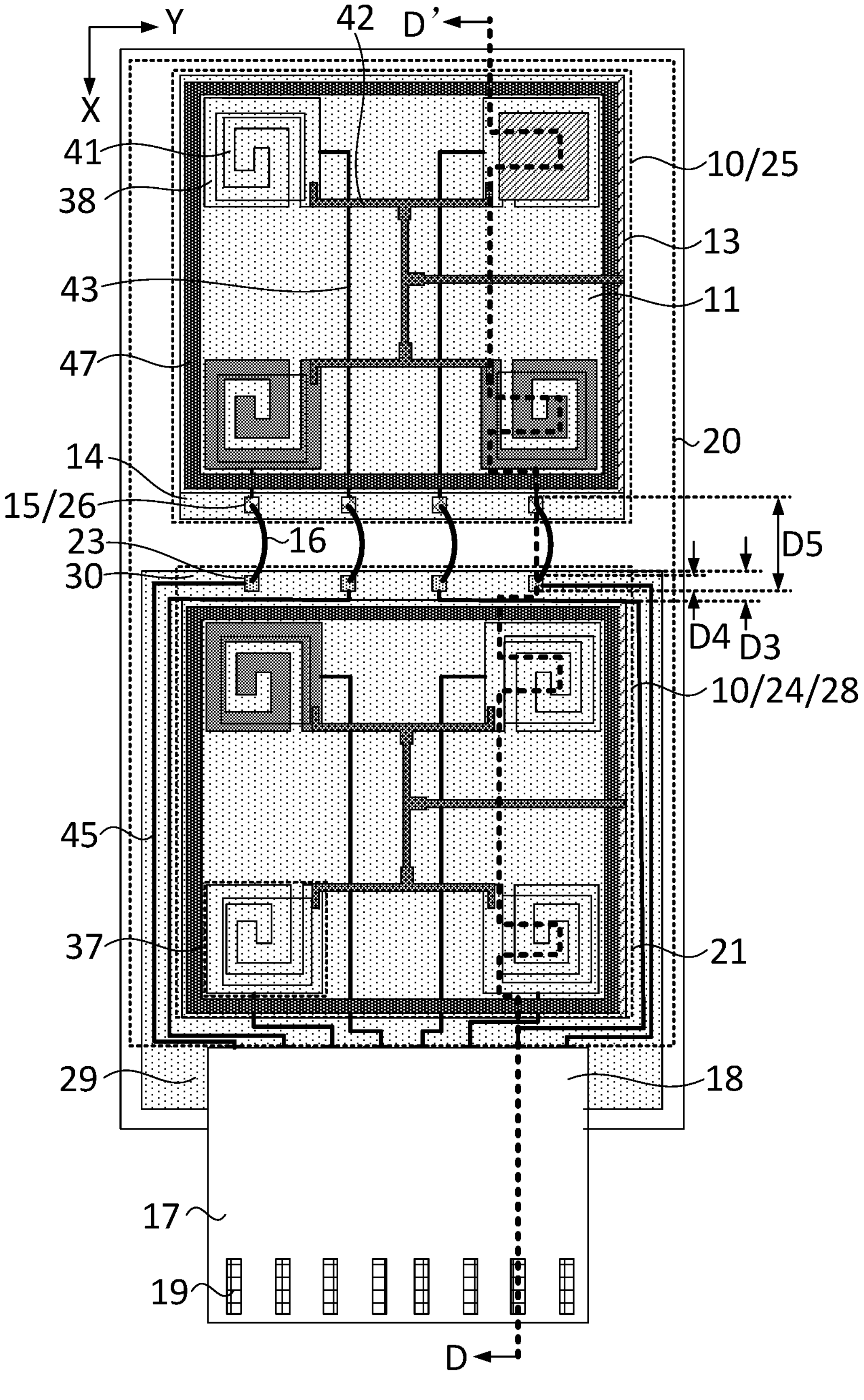
FIG. 9 is a partial structural diagram of an antenna device according to an embodiment of the present disclosure.
Figure 10:
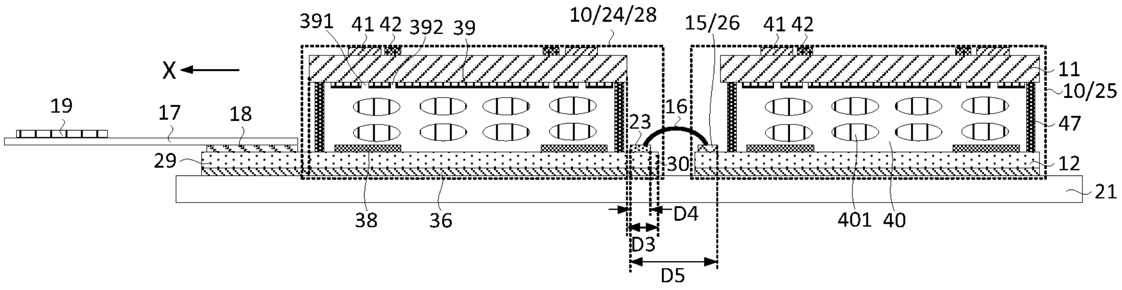
FIG. 10 is a cross sectional view taken along a D-D' direction of FIG. 9.

FIG. 9 is a partial structural diagram of an antenna device according to an embodiment of the present disclosure, and FIG. 10 is a cross sectional view taken along a D-D' direction of FIG. 9. As shown in FIG. 9 and FIG. 10, optionally, the multiple antenna units 10 further includes a third antenna unit 28, and the third antenna unit 28 is disposed at an edge of the antenna unit array 20. The second substrate 12 of the third antenna unit 28 includes a third step 29 protruding from the phase shift region 13 of the third antenna unit 28, the third step 29 is disposed at the edge of the antenna unit array 20; and the multiple binding terminals 18 are disposed on a side of the third step 29 close to the first substrate 11.

Exemplarily, as shown in FIGS. 9 and 10, the third antenna unit 28 is disposed at the edge of the antenna unit array 20, the second substrate 12 of the third antenna unit 28 is provided with the third step 29 protruding from the phase shift region 13 of the third antenna unit 28, and the third step 29 is disposed at the edge of the antenna unit array 20, so that the binding terminals 18 are disposed on the third step 29. The binding terminals 18 are configured to be in binding connection with the flexible printed circuit 17, and the flexible printed circuit 17 is connected to the external driver circuit, so that the access of drive signals is achieved.

At the edge of the antenna unit array 20, the second substrate 12 of the third antenna unit 28 is provided with the third step 29 protruding from the phase shift region 13 of the third antenna unit 28, and the binding terminals 18 are disposed on the third step 29, so that when the binding terminals 18 are bound to the flexible printed circuit 17, it will not be limited by the space of the phase shift region 13, and the binding between the binding terminals 18 and the flexible printed circuit 17 is facilitated.

It should be noted that, as shown in FIGS. 9 and 10, since the binding terminals 18 are disposed on the second substrate 12 of the third antenna unit 28, the drive signal on the binding terminals 18 may be directly introduced into the phase shift region 13. Therefore, the first pads 15 may not be provided for the third antenna unit 28, which is conducive to reducing the size of the third antenna unit 28 and achieving the miniaturization application of the antenna device. However, the present disclosure is not limited to this.

With continued reference to FIGS. 9 and 10, optionally, the multiple antenna units 10 include the first antenna unit 24 and the second antenna unit 25 disposed adjacent to each other, and the first antenna unit 24 is disposed on a side of the first step 14 of the second antenna unit 25 away from the phase shift region 13 of the second antenna unit 25; and the second substrate 24 of the first antenna unit 24 includes a fourth step 30 protruding from the phase shift region 13 of the first antenna unit 24, and the fourth step 30 is disposed on a side of the first antenna unit 24 close to the second antenna unit 25. The antenna device further includes multiple second pads 23, each of the second pads 23 is connected to a respective one of the first pads 15 through a respective one of the first connection lines 16, and each of the binding terminals 18 is connected to a respective one of the second pads 23; and the first pad 15 disposed on the first step 14 of the second antenna unit 25 is the first connection pad 26, and the second pad correspondingly connected to the first connection pad 26 is disposed on a side of the fourth step 30 of the first antenna unit 24 close to the first substrate 11 of the first antenna unit 24.

As shown in FIG. 9 and FIG. 10, the first pads 15 receive the drive signal output by the external driver circuit through the first connection lines 16 instead of being directly bound to the flexible printed circuit 17, so that the size of the first pad 15 can be reduced, and thus the width of the first step 14 can be reduced. At this point, without the limitation of the flexible printed circuit 17, the splicing may be performed on a side of the first step 14 of the antenna unit 10, that is, the periphery of the antenna unit 10 and other antenna units 10 may be spliced, so that the splicing flexibility of the antenna units 10 is improved, which is conducive to achieving the antenna unit array 20 with large size.

Further, as shown in FIGS. 9 and 10, the third step 29 where the binding terminals 18 are located is located at the edge of the antenna unit array 20, so that a distance between the binding terminals 18 and part of the first pads 15 is relatively long, and thus it is difficult to directly connect the binding terminals 18 and the first pads 15.

With continued reference to FIGS. 9 and 10, in this embodiment, the fourth step 30 protruding from the phase shift region 13 of the first antenna unit 24 is disposed on a side of the first antenna unit 24 close to the second antenna unit 25, the second pads 23 correspondingly connected to the binding terminals 18 are disposed on the fourth step 30, and the second pads 23 are correspondingly connected to the first pads 15 through the first connection lines 16, so that the second pads 23 play a role in transferring the drive signal among the antenna units, to introduce the drive signal to the first pads 15 on the second substrate 12 of each antenna unit through the binding terminals 18. Therefore, the difficulty of the connection between the binding terminals 18 and the first pads 15 is reduced and the connection is easy to be implemented.

Further, as shown in FIGS. 9 and 10, the fourth step 30 for disposing the second pads 23 is disposed on a side of the first antenna unit 24 close to the second antenna unit 25, to reduce a distance between the first connection pad 26 and the second pad 23 correspondingly connected thereto, so that the difficulty of connecting the first connection pad 26 and the second pad 23 through the first connection line 16 is reduced.

With continued reference to FIGS. 9 and 10, optionally, the support substrate 21 is disposed to support and fix the antenna units 10, so that the reliability of the antenna unit array 20 may be ensured.

Figure 11:
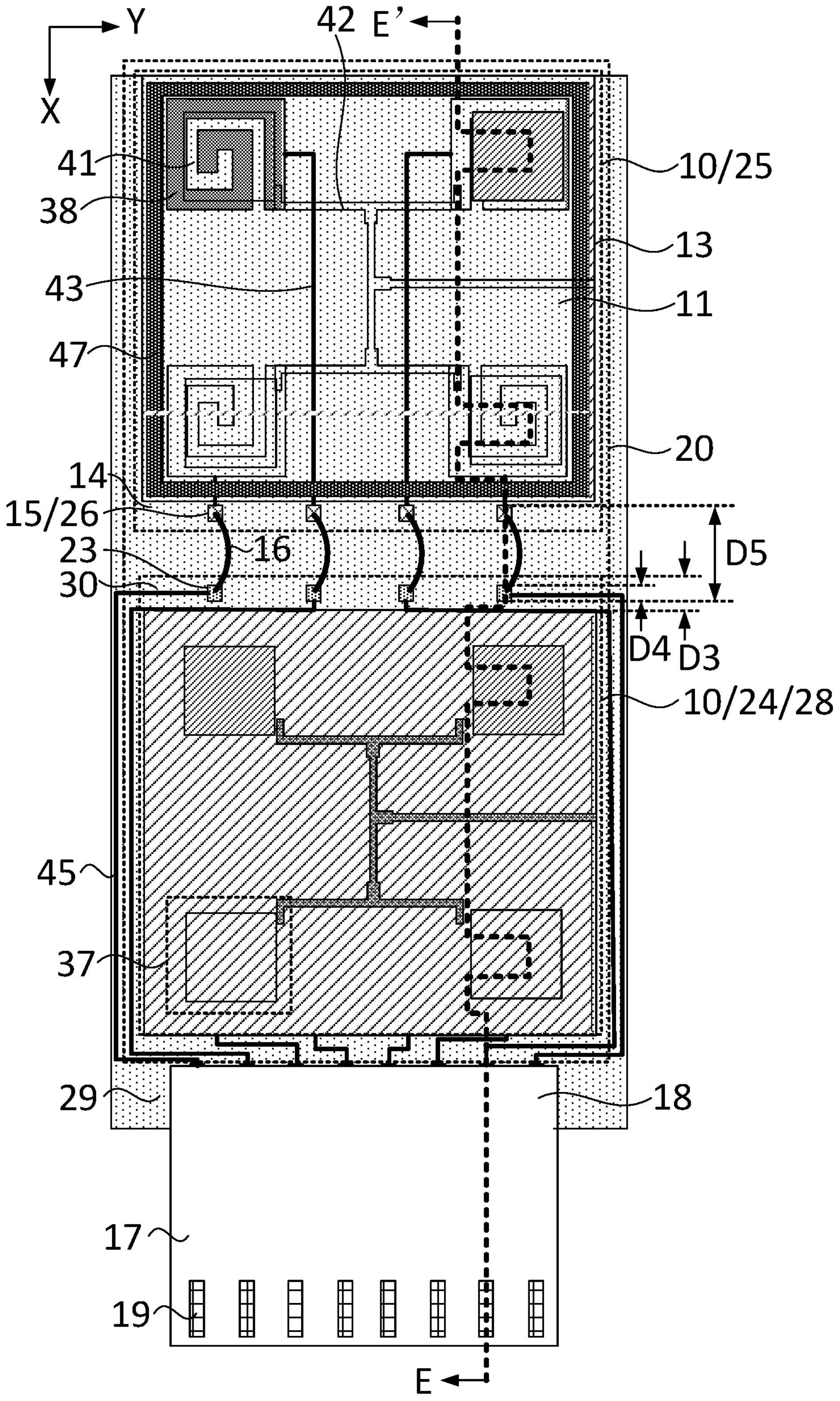
FIG. 11 is a partial structural diagram of another antenna device according to an embodiment of the present disclosure.
Figure 12:
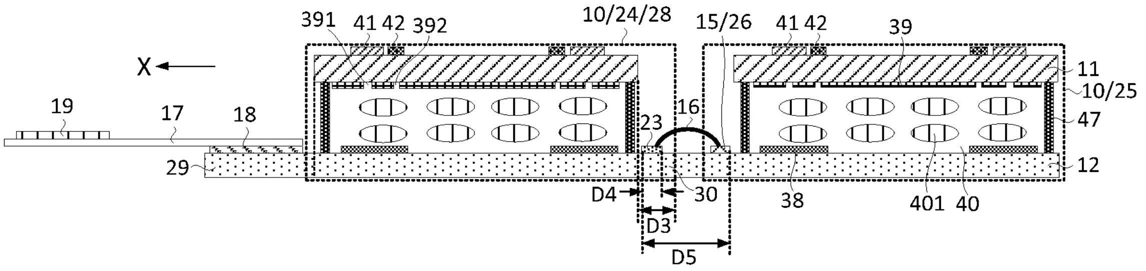
FIG. 12 is a cross sectional view taken along an E-E' direction of FIG. 11.

FIG. 11 is a partial structural diagram of another antenna device according to an embodiment of the present disclosure, and FIG. 12 is a cross sectional view taken along an E-E' direction of FIG. 11. As shown in FIGS. 11 and 12, since drive signals are all transmitted on the second substrates 12, the second substrate 12 of the first antenna unit 24 and the second substrate 12 of the second antenna unit 25 may be set to the same substrate, to support and fix the antenna unit array 20 through the second substrate 12. Therefore, the support substrate 21 may not be provided, which is conducive to reducing the thickness of the antenna device and achieving the light and thin application of the antenna device.

With continued reference to FIGS. 9 to 12, optionally, the second pad 23 may be connected to the binding terminal 18 through a second signal transmission line 45 disposed on the second substrate 12, but which is not limited thereto.

With continued reference to FIGS. 5 to 7 and FIGS. 9 to 12, optionally, the length of the second pad 23 in the first direction X is D4, and D4≤100 μm.

As shown in FIGS. 5 to 7 and FIGS. 9 to 12, the second pads 23 are correspondingly connected to the first pads 15 through the first connection lines 16, and the second pads 23 are correspondingly connected to the binding terminals 18 instead of being directly bound to the flexible printed circuit 17, so that the length D4 of the second pad 23 in the first direction X may be reduced to 100 μm while the transmission reliability of the drive signal is ensured, which is conducive to reducing the size of the whole antenna device and achieving the miniaturization application of the antenna device.

It should be noted that a value of the length D4 of the second pad 23 in the first direction X may be set according to actual requirements, for example, D4=40 μm, but which is not limited thereto. The embodiments of the present disclosure do not limit this.

With continued reference to FIGS. 9 to 12, optionally, in the first direction X, the fourth step 30 has the length of D3, where D3≤0.2 mm.

As shown in FIGS. 9 to 12, the length D3 of the fourth step 30 in the first direction X may be reduced to within 0.2 mm due to the reduction in the size of the second pad 23, which contributes to the reduction in the size of the whole antenna device while providing sufficient setting space for the second pads 23, and thus the miniaturization application of the antenna device is achieved.

With continued reference to FIGS. 5 to 7 and FIGS. 9 to 12, optionally, in a direction parallel to a plane where the support substrate 21 is located, the shortest distance between an edge of a side of the first connection pad 26 away from the second pad 23 corresponding to the first connection pad 26 and an edge of a side of the second pad 23 away from the first connection pad 26 corresponding to the second pad 23 is D5, and D5≤0.3 mm.

As shown in FIGS. 5 to 7 and FIGS. 9 to 12, the shortest distance D5 between the edge of the side of the first connection pad 26 away from the second pad 23 corresponding to the first connection pad 26 and the edge of the side of the second pad 23 away from the first connection pad 26 corresponding to the second pad 23 satisfies a condition of D5≤0.3 mm, so that the second pad 23, the first connection pad 26, and the first connection line 16 for connecting the second pad 23 and the first connection pad 26 do not take up excessive space, which is conducive to reducing the size of the whole antenna device and achieving the miniaturization application of the antenna device.

Optionally, the first connection line 16 is made of at least one of gold, copper, aluminum or silver alloy.

The gold, copper, aluminum and silver alloy are good in conductivity, and the first connection line 16 is made of the above materials, so that the first connection line 16 has a small impedance, and the connection reliability of the first connection line 16 can be improved.

Exemplarily, the first connection line 16 may be a gold wire, and the gold wire has good conductivity and is not easy to break.

Meanwhile, the first connection line 16 is a gold wire and the connection may be performed through a wire bond process. The wire bond process is a manner of a circuit connection in an integrated circuit (IC) package. The second pad 23 and the first pad 15 are connected through the wire bond process, so that the size of the second pad 23 and the size of the first pad 15 can be further reduced (for example, to 40 μm) while the connection firmness and the transmission reliability of the drive signal are ensured, and thus the size of the step can be reduced, which is conducive to reducing the size of the whole antenna device and achieving the miniaturization application of the antenna device.

Figure 13:
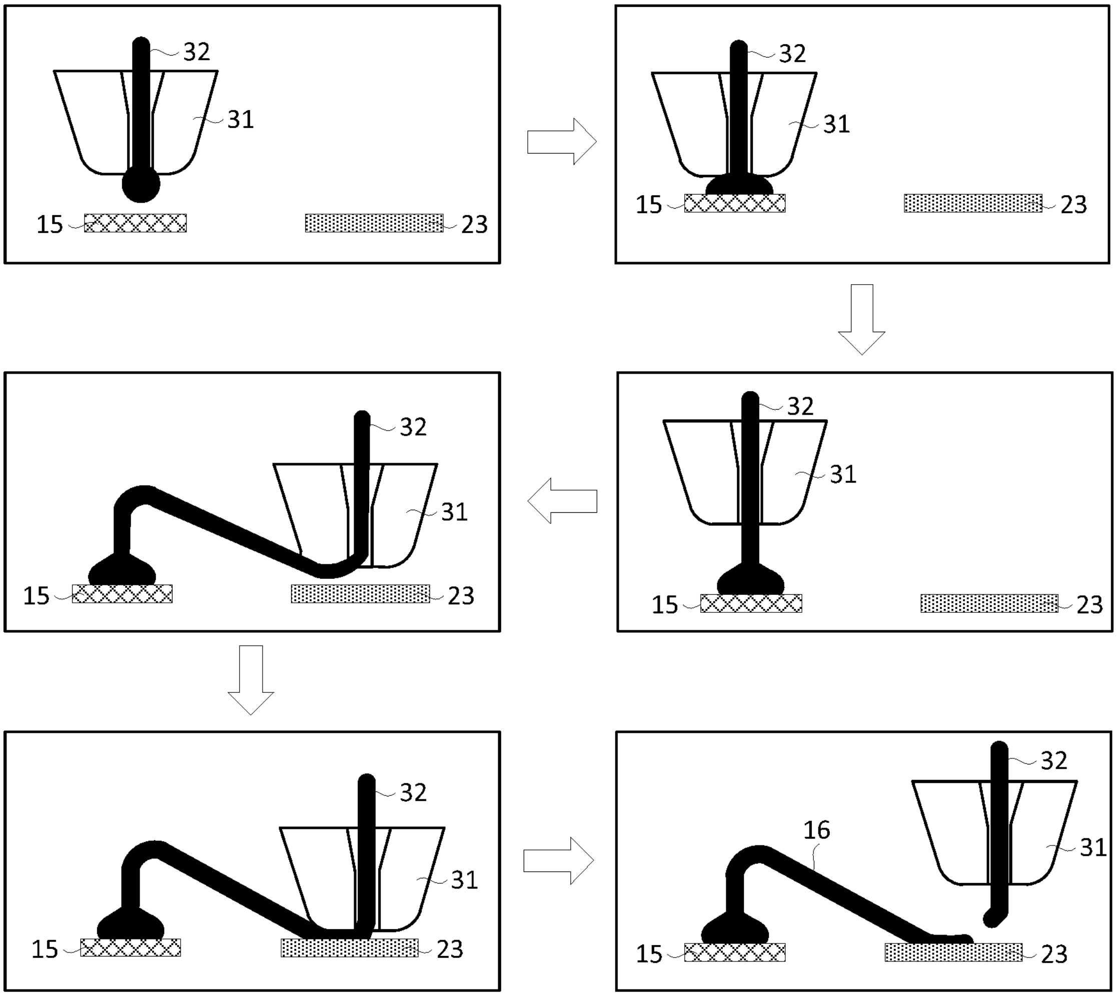
FIG. 13 is a structural diagram of a wire bond according to an embodiment of the present disclosure.

FIG. 13 is a structural diagram of a wire bond according to an embodiment of the present disclosure. As shown in FIG. 13, exemplarily, when the wire bond process is used for connecting the second pad 23 and the first pad 15, a gold wire 32 may penetrate out through a hollow clamp 31; the extended part of the gold wire 32 is melted through the arcing and becomes spherical under the action of a surface tension; a ball is then bonded to one of the first pad 15 and the second pad 23 by the hollow clamp 31, after which a spherical pad is formed; a bent gold wire 32 is drawn out of the spherical pad and then bonded to the other one of the first pad 15 and the second pad 23 to form a flat pad; and the gold wire 32 is broken to form the first connection line 16.

It should be noted that the material and the connection process of the first connection line 16 are not limited to the embodiments described above, and those skilled in the art may select the material and the connection process of the first connection line 16 according to actual requirements, which is not limited in the embodiments of the present disclosure.

Optionally, after the first pad 15 is connected to the second pad 23 through the first connection line 16, the first pad 15, the first connection line 16 and the second pad 23 may be packaged through packaging materials such as UV glue or epoxy glue, so that the first pad 15, the first connection line 16 and the second pad 23 are protected, and the transmission reliability of the drive signal between the first pad 15 and the second pad 23 is further improved.

Figure 14:
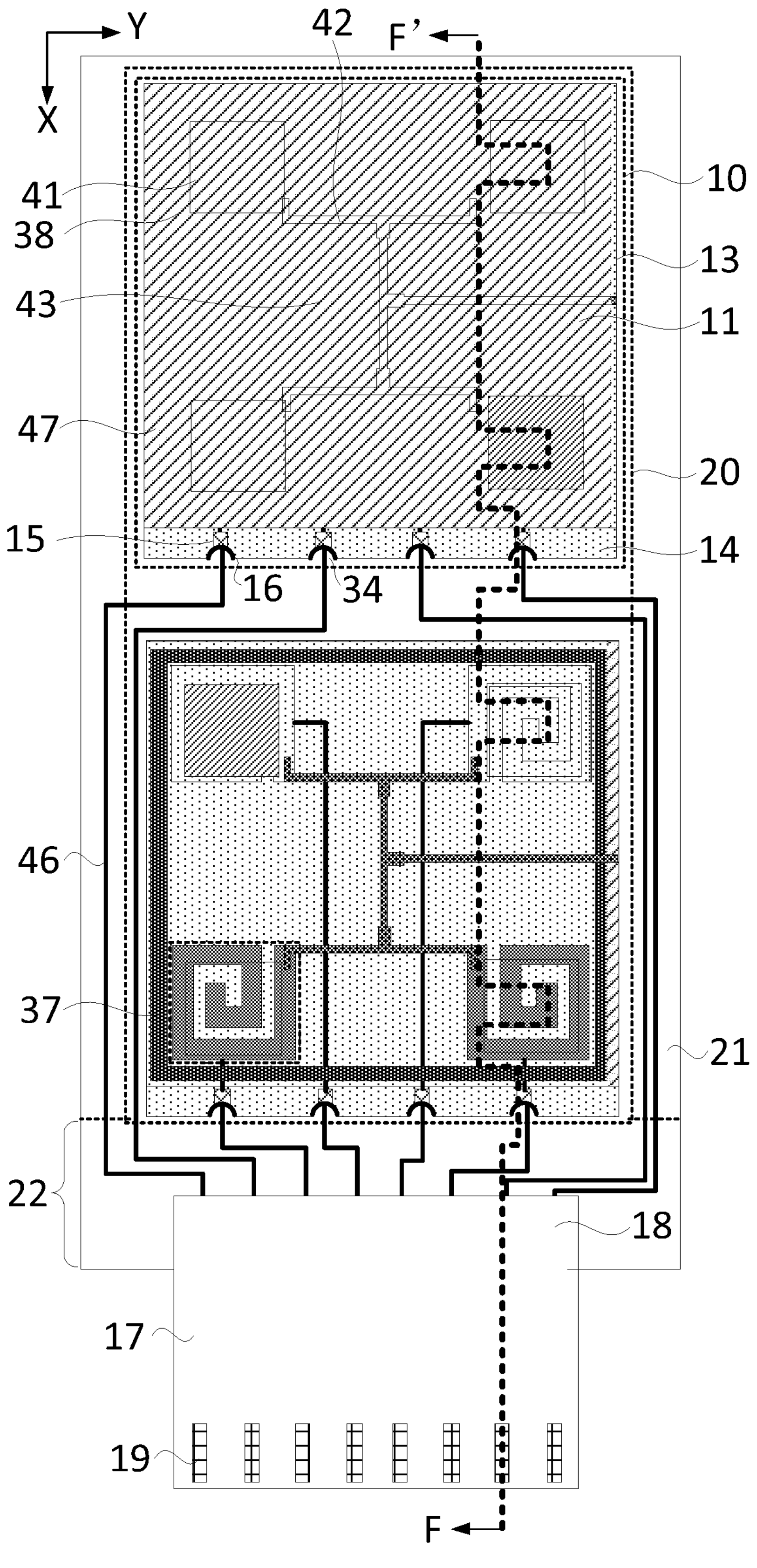
FIG. 14 is a partial structural diagram of another antenna device according to an embodiment of the present disclosure.
Figure 15:
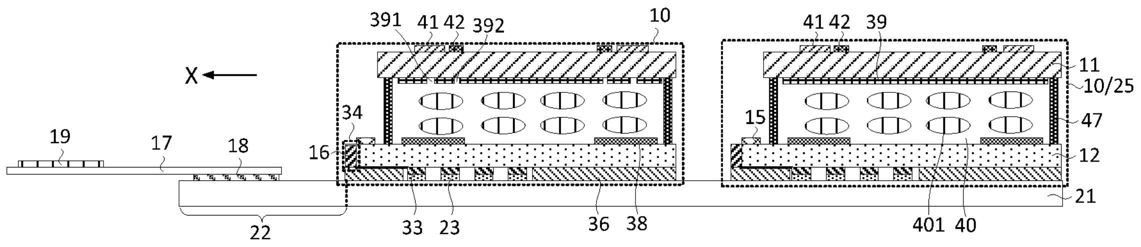
FIG. 15 is a cross sectional view taken along an F-F' direction of FIG. 14.

FIG. 14 is a partial structural diagram of another antenna device according to an embodiment of the present disclosure, and FIG. 15 is a cross sectional view taken along an F-F' direction of FIG. 14. Optionally, the antenna unit 10 further includes multiple third pads 33 disposed on a side of the second substrate 12 away from the first pad 15, and the third pads 33 are correspondingly connected to the first pads 15 through the first connection lines 16. The antenna device further includes multiple second pads 23, the second pads 23 are arranged on a side of the support substrate 21 close to the antenna unit array 20, the second pads 23 are correspondingly connected to the third pads 33, and the binding terminals 18 are correspondingly connected to the second pads 23.

Exemplarily, as shown in FIGS. 14 and 15, the second pads 23 correspondingly connected to the binding terminals 18 are disposed on a side of the support substrate 21 close to the antenna unit array 20, the third pads 33 are disposed on a side of the second substrate 12 away from the first pads 15, and the second pads 23 are correspondingly connected to the third pads 33, so that a drive signal on the binding terminals 18 is connected to a side of the second substrate 12 away from the first pads 15, and the third pads 33 are correspondingly connected to the first pads 15 through the first connection lines 16. Therefore, the drive signal is introduced into the phase shift region 13, to achieve the adjustment of a phase of a radio frequency signal.

The third pads 33 are disposed on a side of the second substrate 12 away from the first pads 15, and the second pads 23 and the third pads 33 are connected on a side of the second substrate 12 away from the first pads 15, so that the influence of the second pads 23 on the size of the antenna device can be avoided, the size of the whole antenna device may be reduced, and thus the miniaturization application of the antenna device is achieved.

With continued reference to FIGS. 14 and 15, optionally, an edge side wall of the first step 14 is provided with multiple grooves 34, the multiple grooves 34 are disposed corresponding to the multiple first pads 15, and the first connection line 16 is a conductive layer covering an inner wall of the groove 34.

Exemplarily, as shown in FIGS. 14 and 15, the grooves 34 are disposed on the edge side wall of the first step 14, a metallization process is performed on the grooves 34 to prepare conductive layers on the inner walls of the grooves 34, so that the first connection lines 16 are formed. The first pad 15 is connected to the third pad 33 through the first connection line 16, so that the drive signal is introduced from the side of the second substrate 12 away from the first pads 15.

The metallization process of the groove 34 may be set according to actual requirements. For example, the groove 34 is first formed on the edge side wall of the first step 14 in a manner of laser or grinding, and then a conductive layer is formed on an inner wall of the groove 34 in a manner of deposition or electroplating to form the first connection line 16, which is not limited in the embodiments of the present disclosure.

With continued reference to FIGS. 14 and 15, optionally, a vertical projection of the groove 34 on a plane where the first substrate 11 is located includes a semicircle or a polygon.

Exemplarily, as shown in FIG. 14, the grooves 34 may be semi-circular, which is simple in process and easy to be implemented.

Figure 16:
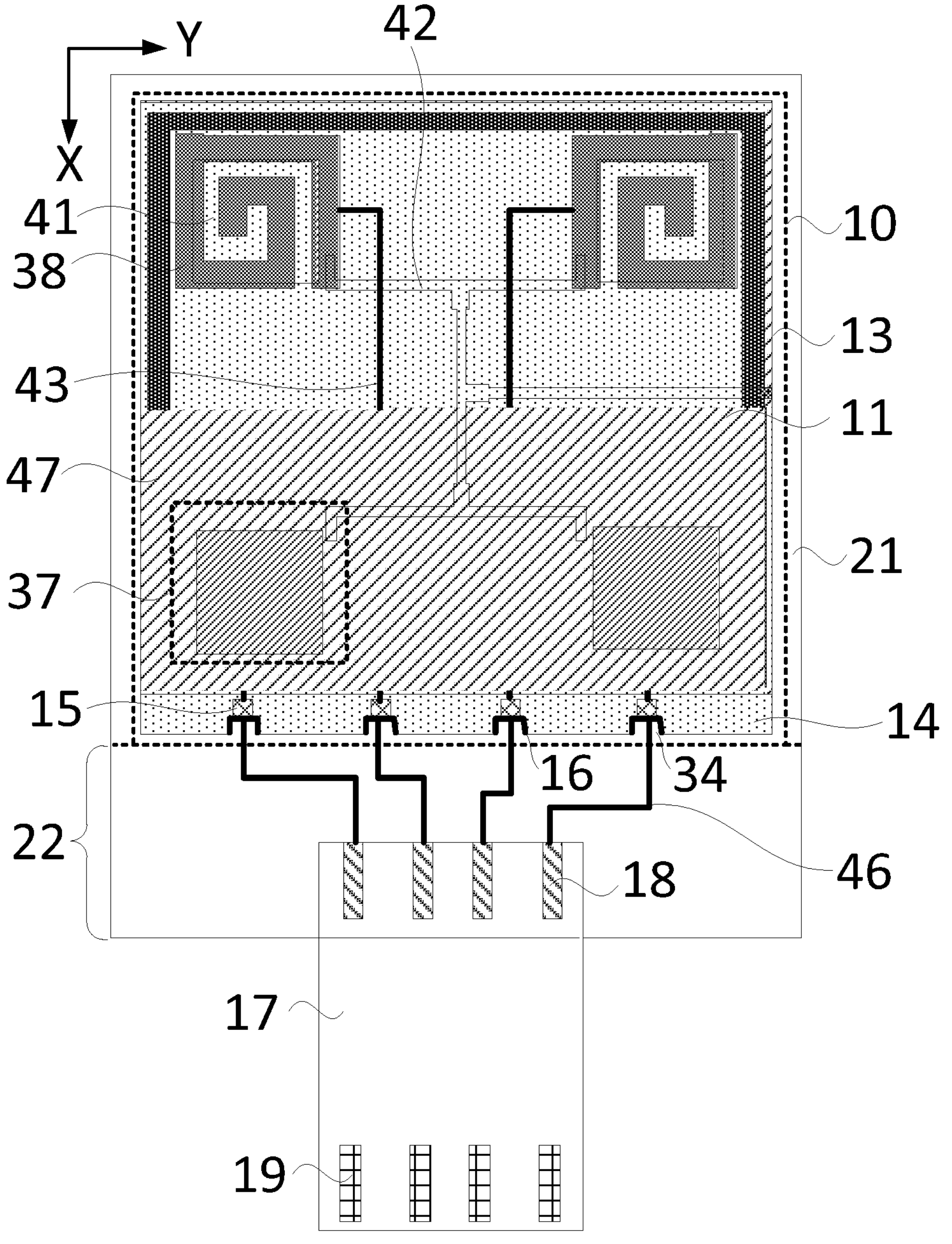
FIG. 16 is a partial structural diagram of another antenna device according to an embodiment of the present disclosure.

FIG. 16 is a partial structural diagram of another antenna device according to an embodiment of the present disclosure. As shown in FIG. 16, the grooves 34 may be set to be rectangular, and in other embodiments, the grooves 34 may also be configured to be any other shape, which is not limited in the embodiments of the present disclosure.

With continued reference to FIGS. 14 to 16, optionally, the second pad may be connected to the binding terminal 18 through a third signal transmission line 46 disposed on the support substrate 21, but which is not limited thereto.

It should be noted that the first signal transmission lines 44, the second signal transmission lines 45, or the third signal transmission lines 46 in the above embodiments may be located in a same film layer, but which are not limited thereto. When the number of antenna units 10 in the antenna unit array 20 is relatively large, the first signal transmission lines 44, the second signal transmission lines 45, or the third signal transmission lines 46 may be disposed in multiple film layers, and different film layers are isolated by insulating layers, so that transmission lines in the different film layers may overlap in the thickness direction of the first substrate 11, and the influence of excessive transmission lines on the size of the antenna device is reduced.

With continued reference to FIG. 15, optionally, the second pad 23 is in contact connection with the third pad 33 corresponding to the second pad 23.

Exemplarily, as shown in FIG. 15, the second pad 23 is in direct contact connection with the third pad 33 corresponding to the second pad 23, so that no other connection structure is needed, which is conducive to reducing the thickness of the antenna device and achieving the light and thin application of the antenna device.

Figure 17:
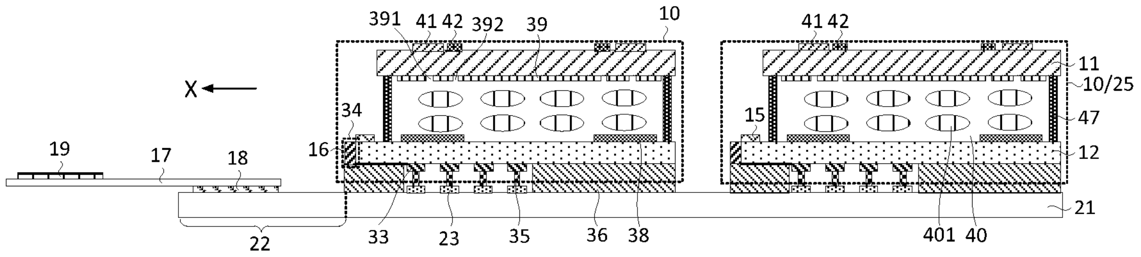
FIG. 17 is a partial cross sectional view of an antenna device according to an embodiment of the present disclosure.

FIG. 17 is a partial cross sectional view of an antenna device according to an embodiment of the present disclosure. As shown in FIG. 17, optionally, the antenna device provided in the embodiment of the present disclosure further includes conductive connection structures 35, and each of the conductive connection structures 35 is connected to a respective second pad of the second pads 23 and a respective third pad of the third pads 33 that corresponds to the respective second pad, respectively.

The second substrate 12 and/or the support substrate 21 may have a problem of uneven surface so that there may be a gap between the second pad 23 and the third pad 33 corresponding thereto, causing that the second pad 23 and the third pad 33 cannot be contacted. In this embodiment, as shown in FIG. 17, the conductive connection structure 35 with a certain thickness is provided to connect the second pad 23 and the third pad 33, so that a connection between the second pad 23 and the third pad 33 can be secured, and the reliability of the antenna device can be improved.

It should be noted that the specific structure of the conductive connection structure 35 may be set according to actual requirements as long as the connection between the second pad 23 and the third pad 33 is ensured.

For example, the conductive connection structure 35 may be a pin, where the pin is a pin-shaped metal structure with or without elasticity, and the connection can be more reliable by connecting the pin between the second pad 23 and the third pad 33.

The material of the conductive connection structure 35 may be set according to actual requirements. For example, the material of the conductive connection structure 35 includes copper and/or gold, to ensure the conductive performance of the conductive connection structure 35. For example, the conductive connection structure 35 is a structure with gold plated on the outer side of the copper material, so that the cost can be reduced while the conductive performance of the conductive connection structure 35 is ensured.

Moreover, in the thickness direction of the first substrate 11, the length of the conductive connection structure 35 may be set according to actual requirements, for example, the length of the conductive connection structure 35 is 1 mm to 10 mm, but which is not limited thereto.

Figure 18:
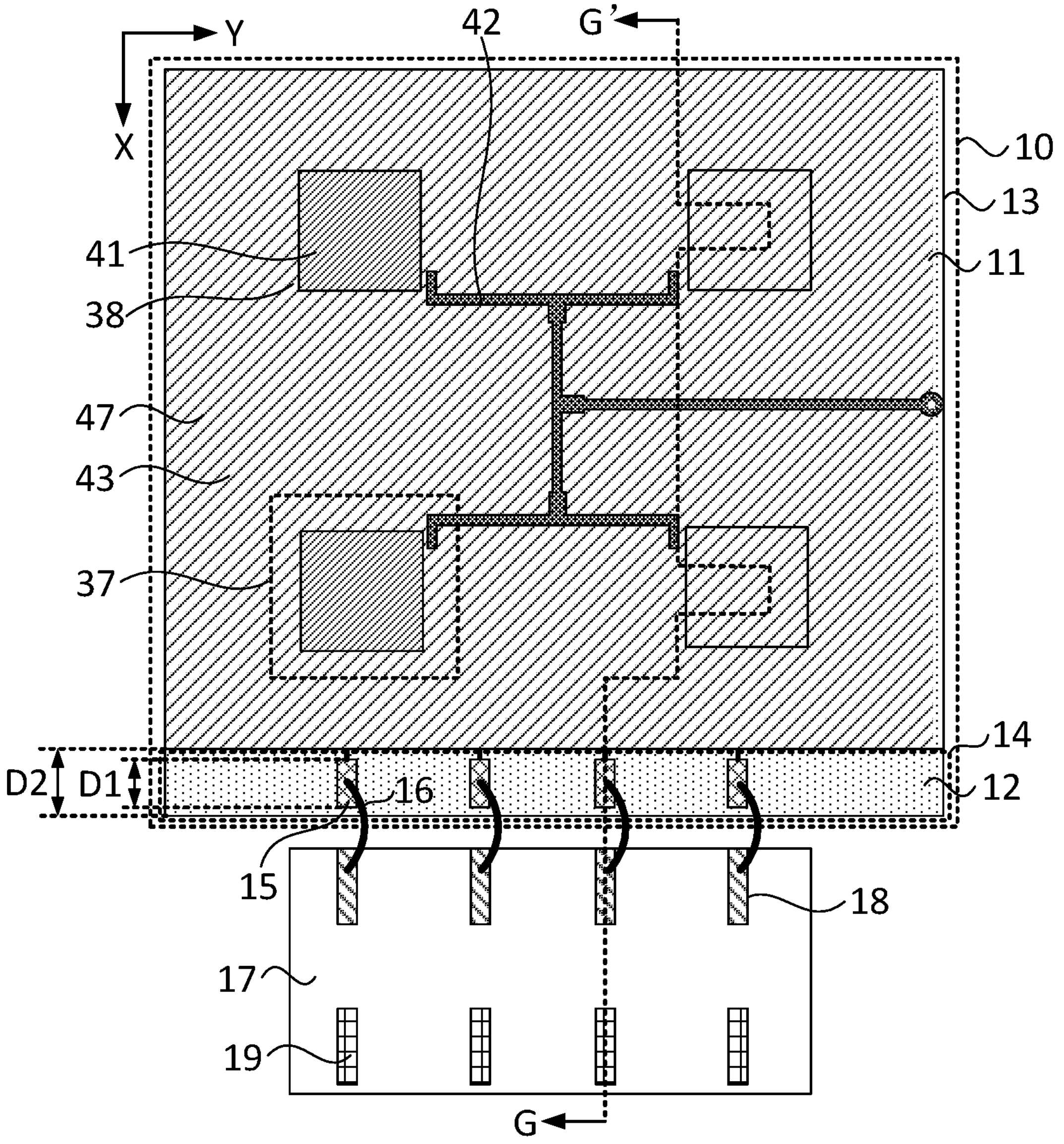
FIG. 18 is a structural diagram of another antenna device according to an embodiment of the present disclosure.
Figure 19:
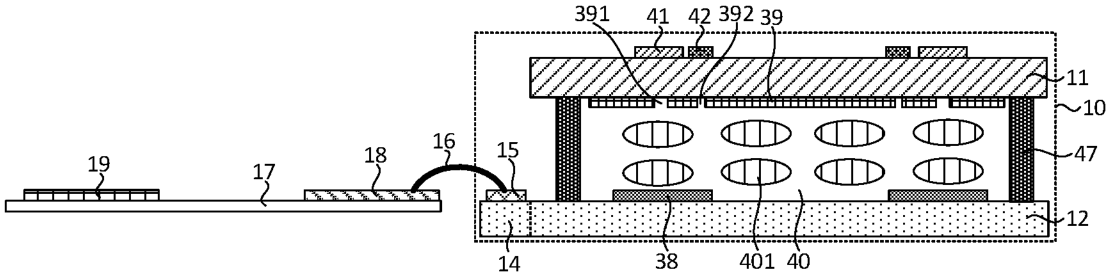
FIG. 19 is a cross sectional view taken along a G-G' direction of FIG. 18.

FIG. 18 is a structural diagram of another antenna device according to an embodiment of the present disclosure, and FIG. 19 is a cross sectional view taken along a G-G' direction of FIG. 18. As shown in FIGS. 18 and 19, optionally, the antenna device provided in the embodiment of the present disclosure further includes multiple binding terminals 18, the binding terminals 18 are correspondingly connected to the first connection lines 16, the binding terminals 18 are disposed on a flexible printed circuit 17, and the flexible printed circuit 17 is connected to an external driver circuit.

Exemplarily, as shown in FIGS. 18 and 19, multiple binding terminals 18 are disposed on the flexible printed circuit 17, and the first connection lines 16 are directly connected to the binding terminals 18 on the flexible printed circuit 17 to enable the transmission of drive signals between the first pads 15 and the binding terminals 18. Further, the flexible printed circuit 17 is further provided with connection binding terminals 19, the connection binding terminals 19 are electrically connected to the binding terminals 18, and the connection binding terminals 19 are configured to be in binding connection with the external driver circuit, so that an electric connection between the external driver circuit and the binding terminals 18 is achieved.

When the antenna device is used, the flexible printed circuit 17 may be bent to a side of the second substrate 12 away from the first substrate 11, so that the influence of the flexible printed circuit 17 on the width of the frame of the antenna device can be avoided on the basis of narrowing the first step 14, which is conducive to reducing the size of the whole antenna device and achieving the miniaturization application of the antenna device.

With continued reference to FIGS. 6, 10, 15 and 17, optionally, the antenna device provided in the embodiment of the present disclosure further includes an adhesive layer 36 disposed between the second substrate 12 of the antenna unit 10 and the support substrate 21.

In this embodiment, the adhesive layer 36 disposed between the second substrate 12 and the support substrate 21 is provided to fix the antenna unit 10 on the support substrate 21, so that the reliability of the antenna device is ensured.

As shown in FIGS. 6 and 10, the adhesive layer 36 may be provided on the second substrate 12 in an entire layer to improve the adhesion firmness between the antenna unit 10 and the support substrate 21.

In other embodiments, as shown in FIGS. 15 and 17, the adhesive layer 36 may also be disposed partially on the second substrate 12, so that the influence of the adhesive layer 36 on the connection between the second pad 23 and the third pad 33 can be avoided. This may be set by those skilled in the art according to actual requirements.

It should be noted that the material of the adhesive layer 36 may be set according to actual requirements, for example, the adhesive layer 36 may be made of a frame adhesive, an encapsulation adhesive, an optical adhesive, or the like, which is not limited in the embodiments of the present disclosure.

In other embodiments, the second substrate 12 and the support substrate 21 may be directly physically connected. For example, the second substrate 12 and the support substrate 21 may be directly physically connected by using a snap-fit structure, to avoid the influence of the adhesive layer 36 on the radio frequency signal. This is not limited in the embodiments of the present disclosure.

With continued reference to FIGS. 1 to 12 and FIGS. 14 to 19, optionally, the antenna unit 10 further includes multiple phase shift units 37, the multiple phase shift units 37 are arranged in an array in the phase shift region 13, and the phase shift units 37 are configured to adjust a phase of a radio frequency signal. In the antenna device, a gap distance between adjacent phase shift units 37 is equal.

Exemplarily, as shown in FIGS. 1 to 19, the antenna unit 10 includes multiple phase shift units 37 arranged in an array, the phase shift units 37 are configured to adjust the phase of the radio frequency signal to achieve the control of the beam direction of the radio frequency signal transmitted by the antenna unit 10 and thus achieve the beam scanning.

As shown in FIGS. 1 to 12 and FIGS. 14 to 19, in the antenna device, by setting the gap distance between any adjacent phase shift units 37 being equal, the antenna pattern side lobe can be slight, and the scanning performance of the antenna device can be ensured.

With continued reference to FIGS. 5, 7, 9, 11 and 14, when the antenna device includes multiple antenna units 10, since the first pads 15 receive the drive signals output by the external driver circuit through the first connection lines 16 instead of being directly bound to the flexible printed circuit 17, the size of the first pad 15 can be reduced while the connection firmness and transmission reliability of the drive signals are ensured, and thus the width of the first step 14 can be reduced.

At this point, without the limitation of the flexible printed circuit 17, the splicing may be performed on a side of the first step 14 of the antenna unit 10, that is, the periphery of the antenna unit 10 and other antenna units 10 may be spliced, so that the splicing flexibility of the antenna units 10 is improved, which is conducive to achieving the antenna unit array 20 with large size.

Meanwhile, the reduction in the width of the first step 14 can ensure that the gap distance between the phase shift units 37 in the adjacent antenna units 10 is not increased, thereby ensuring the scanning performance of the antenna device.

The gap distance between adjacent phase shift units 37 may be set according to actual requirements. For example, the gap distance between adjacent phase shift units 37 is ½ to 1 times of the operating wavelength, which is not limited in the embodiment of the present disclosure.

With continued reference to FIGS. 1 to 12 and FIGS. 14 to 19, optionally, the phase shift unit 37 includes a microstrip line 38, a ground metal layer 39 and a liquid crystal layer 40. The microstrip line 38 is disposed on a side of the second substrate 12 close to the first substrate 11, the ground metal layer 39 is disposed on a side of the first substrate 11 close to the second substrate 12, and the liquid crystal layer 40 is disposed between the first substrate 11 and the second substrate 12. The antenna unit 10 further includes a radiation electrode 41 and a feed network 42, the radiation electrode 41 is disposed on a side of the first substrate 11 away from the second substrate 12, and the feed network 42 is in coupling connection with the microstrip line 38.

Exemplarily, as shown in FIGS. 1 to 12 and FIGS. 14 to 19, the phase shift unit 37 includes the liquid crystal layer 40 disposed between the first substrate 11 and the second substrate 12, the microstrip line 38 is disposed on a side of the liquid crystal layer 40 away from the first substrate 11, and the ground metal layer 39 is disposed on a side of the liquid crystal layer 40 away from the second substrate 12 An electric field is formed between the microstrip line 38 and the ground metal layer 39 by applying drive signals to the microstrip line 38 and the ground metal layer 39, respectively, and the electric field may drive liquid crystal molecules 401 in the liquid crystal layer 40 to deflect, thereby changing a dielectric constant of the liquid crystal layer 40. The microstrip line 38 is further configured to transmit a radio frequency signal, the radio frequency signal is transmitted in the liquid crystal layer 40 between the microstrip line 38 and the ground metal layer 39, and due to a change of a dielectric constant of the liquid crystal layer 40, the radio frequency signal transmitted on the microstrip line 38 is phase-shifted, so that a phase of the radio frequency signal is changed, and the phase shift function of the radio frequency signal is achieved.

With continued reference to FIGS. 1 to 12 and FIGS. 14 to 19, optionally, a radiation electrode 41 is further disposed on a side of the first substrate 11 away from the second substrate 12, and a perpendicular projection of the ground metal layer 39 on the first substrate 11 at least partially overlaps a perpendicular projection of the radiation electrode 41 on the first substrate 11. The ground metal layer 39 is provided with a first hollow portion 391, the vertical projection of the radiation electrode 41 on a plane where the ground metal layer 39 is located covers the first hollow portion 391, a vertical projection of the microstrip line 38 on the plane where the ground metal layer 39 is located covers the first hollow portion 391, the radio frequency signal is transmitted between the microstrip line 38 and the ground metal layer 39, the liquid crystal layer 40 between the microstrip line 38 and the ground metal layer 39 shifts the phase of the radio frequency signal to change the phase of the radio frequency signal, and the radio frequency signal after the phase shift is coupled to the radiation electrode 41 at the first hollow portion 391 of the ground metal layer 39, so that the radiation electrode 41 radiates the signal outwards.

It should be noted that the radiation electrodes 41 are disposed corresponding to the microstrip lines 38. For example, the radiation electrodes 41 are in one-to-one correspondence with the microstrip lines 38, and the radiation electrodes 41 corresponding to different microstrip lines 38 are insulated from each other. Optionally, different drive signals are applied to different microstrip lines 38, so that liquid crystal molecules at positions corresponding to different microstrip lines 38 are deflected differently, and the dielectric constants of the liquid crystal layer 40 at the positions are different, to adjust phases of radio frequency signals at different positions of the microstrip lines 38. Finally, different beam directions of the radio frequency signals are achieved.

With continued reference to FIGS. 1 to 12 and FIGS. 14 to 19, optionally, the feed network 42 is disposed on a side of the first substrate 11 away from the second substrate 12, the feed network 42 is coupled to the microstrip lines 38, and the feed network 42 is configured to transmit a radio frequency signal to each microstrip line 38, where the feed network 42 may be distributed in a tree shape and includes multiple branches, and one branch provides a radio frequency signal for one microstrip line 38. The ground metal layer 39 includes a second hollow portion 392, a vertical projection of the feed network 42 on the first substrate 11 covers a vertical projection of the second hollow portion 392 on the first substrate 11, the radio frequency signal transmitted by the feed network 42 is coupled to the microstrip line 38 at the second hollow portion 392 of the ground metal layer 39, and the dielectric constant of the liquid crystal layer 40 is changed by controlling the deflection of liquid crystal molecules 401 in the liquid crystal layer 40, so that the phase shift of the radio frequency signal on the microstrip line 38 is achieved.

In other embodiments, the feed network 42 may also be disposed on the same layer as the microstrip line 38, and the feed network 42 is coupled to the microstrip line 38, which may be set by those skilled in the art according to actual requirements, and is not limited in the embodiments of the present disclosure.

With continued reference to FIGS. 1 to 12 and FIGS. 14 to 19, optionally, the first pad 15 is connected to the microstrip line 38 through a drive signal line 43 to provide a drive signal for the microstrip line 38, and different drive signals are applied to different microstrip lines 38, so that liquid crystal molecules at positions corresponding to different microstrip lines 38 are deflected differently, and dielectric constants of the liquid crystal layer 40 at the positions are different, to adjust phases of radio frequency signals at different positions of the microstrip lines 38. Finally, different beam directions of the radio frequency signals are achieved.

In other embodiments, the first pad 15 may also be connected to the ground metal layer 39 through a conductive structure to provide a ground signal for the microstrip line 38, which may be set by those skilled in the art according to practical requirements and is not limited in the embodiments of the present disclosure.

With continued reference to FIGS. 1 to 12 and FIGS. 14 to 19, optionally, the antenna device provided in the embodiments of the present disclosure further includes a support structure 47, where the support structure 47 is configured to support the first substrate 11 and the second substrate 12 to provide a containment space for the liquid crystal layer 40.

Optionally, materials of the first substrate 11, the second substrate 12 and the support substrate 21 may be set according to actual requirements. For example, the first substrate 11, the second substrate 12 and the support substrate 21 may be made of glass, a printed circuit board (PCB) material or the like, which is not limited in the embodiments of the present disclosure.

Optionally, materials of the microstrip line 38, the ground metal layer 39, the radiation electrode 41 and the feed network 42 may be set according to actual requirements. For example, the microstrip line 38 and the ground metal layer 39 may be made of gold or copper, which is not specifically limited in the embodiments of the present disclosure.

Optionally, materials of the first pad 15, the second pad 23, and the third pad 33 may be set according to actual requirements. For example, the first pad 15, the second pad 23, and the third pad 33 may be made of indium tin oxide (ITO) or copper (Cu) so that the first pad 15, the second pad 23, and the third pad 33 are difficult to be oxidized. The materials are not limited in the embodiments of the present disclosure.

It should be noted that the above are merely preferred embodiments of the present disclosure and the technical principles applied herein. It should be understood by those skilled in the art that the present disclosure is not limited to the particular embodiments described herein. For those skilled in the art, various apparent modifications, adaptations, combinations and substitutions may be made without departing from the scope of the present disclosure. Therefore, although the present disclosure has been described in detail through the above embodiments, the present disclosure is not limited to the above embodiments and may include more other equivalent embodiments without departing from the concept of the present disclosure. The scope of the present disclosure is determined by the scope of the appended claims.

What is claimed is:

1. An antenna device, comprising: a plurality of antenna units and first connection lines;

wherein each of the plurality of antenna units comprises a first substrate and a second substrate disposed opposite to each other; a region where the first substrate and the second substrate overlap forms a phase shift region in a thickness direction of the first substrate;

wherein each of the plurality of antenna units further comprises a plurality of phase shift units, and each of the plurality of phase shift units comprises a microstrip line disposed on a side of the second substrate close to the first substrate;

the second substrate comprises a first side and a second side in the thickness direction of the first substrate, the first side of the second substrate is close to the first substrate and the second side of the second substrate is away from the first substrate; and the second substrate comprises a first step protruding from the phase shift region and extending along a first direction, the first direction is a direction parallel to a plane where the second substrate is located and perpendicular to the thickness direction of the first substrate, a side of the first step close to the first substrate is provided with a plurality of first pads arranged in a second direction, the plurality of first pads are directly disposed on the first side of the second substrate, and the first direction intersects the second direction; and wherein a first pad of the plurality of first pads is directly connected to a first connection line of the first connection lines, and the plurality of first pads are configured to receive a drive signal output by an external driver circuit through the first connection lines, and send the drive signal to the microstrip line;

wherein the antenna device further comprises a plurality of binding terminals, a binding terminal of the plurality of binding terminals is connected to the first connection line of the first connection lines, and the plurality of binding terminals are configured to be connected to the external driver circuit; and wherein the antenna device further comprises a support substrate, and the plurality of binding terminals are disposed on the support substrate; and wherein the plurality of antenna units are arranged in an array to form an antenna unit array, the antenna unit array are arranged on a same side of the support substrate, the support substrate comprises a second step protruding from the antenna unit array and extending along the first direction, the second step is located outside a coverage region of a vertical projection of the antenna unit array on a plane where the support substrate is located, the second step is located at an edge of the antenna device, the plurality of binding terminals are disposed on the second step, and the plurality of binding terminals and the antenna unit array are disposed on the same side of the support substrate.

2. The antenna device of claim 1, wherein a length of each of the plurality of first pads in the first direction is D1, and D1≤100 μm.

3. The antenna device of claim 1, wherein a length of the first step in the first direction is D2, and D2≤0.2 mm.

4. The antenna device of claim 1, wherein the antenna device further comprises: a plurality of second pads, wherein the plurality of second pads are disposed on the support substrate, and the plurality of second pads and the antenna unit array are disposed on the same side of the support substrate; and a second pad of the plurality of second pads is connected to the first pad of the plurality of first pads through the first connection line of the first connection lines, and the binding terminal of the plurality of binding terminals is electrically connected to the second pad of the plurality of second pads.

5. The antenna device of claim 4, wherein the plurality of antenna units comprise a first antenna unit and a second antenna unit disposed adjacent to each other, and in the first direction, the first antenna unit is disposed on a side of the first step of the second antenna unit away from the phase shift region of the second antenna unit; and the first pad disposed on the first step of the second antenna unit is a first connection pad, and the second pad correspondingly connected to the first connection pad is disposed on a side of the first antenna unit close to the second antenna unit.

6. The antenna device of claim 5, wherein in a direction parallel to a plane where the support substrate is located, a shortest distance between an edge of a side of the first connection pad away from the second pad corresponding to the first connection pad and an edge of a side of the second pad away from the first connection pad corresponding to the second pad is D5, and D5≤0.3 mm.

7. The antenna device of claim 4, wherein a length of each of the plurality of second pads in the first direction is D4, and D4≤100 μm.

8. The antenna device of claim 4, wherein the first connection lines are made of at least one of gold, copper, aluminum or silver alloy.

9. The antenna device of claim 1, wherein the plurality of antenna units further comprises a third antenna unit disposed at an edge of the antenna unit array; the second substrate of the third antenna unit comprises a third step protruding from the phase shift region of the third antenna unit, and the third step is disposed at the edge of the antenna unit array; and the plurality of binding terminals are disposed on a side of the third step close to the first substrate;

wherein the plurality of antenna units comprise a first antenna unit and a second antenna unit disposed adjacent to each other, and the first antenna unit is disposed on a side of the first step of the second antenna unit away from the phase shift region of the second antenna unit; the second substrate of the first antenna unit comprises a fourth step protruding from the phase shift region of the first antenna unit, and the fourth step is located on a side of the first antenna unit close to the second antenna unit; and wherein the antenna device further comprises: a plurality of second pads, wherein a second pad of the plurality of second pads is connected to the first pad of the plurality of first pads through the first connection line of the first connection lines, and the binding terminal of the plurality of binding terminals is electrically connected to the second pad of the plurality of second pads; and the first pad disposed on the first step of the second antenna unit is a first connection pad, and the second pad of the plurality of second pads correspondingly connected to the first connection pad is disposed on a side of the fourth step of the first antenna unit close to the first substrate of the first antenna unit.

10. The antenna device of claim 9, wherein in the first direction, a length of the fourth step is D3, and D3≤0.2 mm.

11. The antenna device of claim 1, wherein each of the plurality of antenna units further comprises a plurality of third pads, and the plurality of third pads are disposed on a side of the second substrate away from the plurality of first pads; and a third pad of the plurality of third pads is connected to the first pad of the plurality of first pads through the first connection line of the first connection lines; and wherein the antenna device further comprises: a plurality of second pads, wherein the plurality of second pads are disposed on a side of the support substrate close to the antenna unit array; and a second pad of the plurality of second pads is connected to the third pad of the plurality of third pads in each antenna unit of the plurality of antenna units, and the binding terminal of the plurality of binding terminals is electrically connected to the second pad of the plurality of second pads.

12. The antenna device of claim 11, wherein the second pad of the plurality of second pads is in contact connection with the third pad of the plurality of third pads.

13. The antenna device of claim 11, further comprising: a plurality of conductive connection structures, wherein a conductive connection structure of the conductive connection structures is connected to the second pad of the plurality of second pads and the third pad of the plurality of third pads.

14. The antenna device of claim 1, wherein the plurality of phase shift units are arranged in an array in the phase shift region, and the plurality of phase shift units are configured to adjust a phase of a radio frequency signal; and in the antenna device, a gap distance between adjacent phase shift units of the plurality of phase shift units is equal;

wherein each of the plurality of phase shift units comprises: a ground metal layer disposed on a side of the first substrate close to the second substrate, and a liquid crystal layer disposed between the first substrate and the second substrate; and wherein each of the plurality of antenna units further comprises a radiation electrode and a feed network, the radiation electrode is disposed on a side of the first substrate away from the second substrate, and the feed network is in coupling connection with the microstrip line.

* * * * *